United States Patent
Rowland et al.

(10) Patent No.: US 9,097,346 B1
(45) Date of Patent: Aug. 4, 2015

(54) CLOSURE LIP SEAL RELIEF

(71) Applicant: Sypris Technologies, Inc., Louisville, KY (US)

(72) Inventors: Clifford M. Rowland, Simpsonville, KY (US); William L. Schmidt, Leitchfield, KY (US)

(73) Assignee: Sypris Technologies, Inc., Louisville, KY (US)

( * ) Notice: Subject to any disclaimer, the term of this patent is extended or adjusted under 35 U.S.C. 154(b) by 0 days.

(21) Appl. No.: 13/837,197

(22) Filed: Mar. 15, 2013

(51) Int. Cl.
*B65D 53/02* (2006.01)
*F16J 15/02* (2006.01)
*B65D 45/02* (2006.01)

(52) U.S. Cl.
CPC ....................... *F16J 15/02* (2013.01)

(58) Field of Classification Search
CPC .............. F16J 15/46; B65D 53/02; B65D 2543/00972; B01J 3/03
USPC .................................. 220/232, 378
See application file for complete search history.

(56) References Cited

U.S. PATENT DOCUMENTS

| | | | |
|---|---|---|---|
| 3,042,248 A | 7/1962 | Krueger | |
| 3,114,561 A | 12/1963 | Creath et al. | |
| 3,285,615 A | 11/1966 | Trbovich | |
| 3,307,735 A * | 3/1967 | Bollfrass et al. | 220/328 |
| 3,635,499 A | 1/1972 | Reddy | |
| 3,690,682 A | 9/1972 | Ferrill | |
| 4,664,281 A * | 5/1987 | Falk et al. | 220/3.8 |
| 5,676,757 A * | 10/1997 | Ikeda et al. | 118/733 |
| 5,746,359 A * | 5/1998 | Stanek et al. | 222/542 |
| 6,116,610 A | 9/2000 | Goldswain et al. | |
| 6,224,058 B1 | 5/2001 | Drebing et al. | |
| 6,325,101 B1 | 12/2001 | Stoll et al. | |
| 6,837,498 B2 * | 1/2005 | Fluck et al. | 277/630 |
| 7,373,951 B2 | 5/2008 | Gossett et al. | |
| 7,578,407 B2 * | 8/2009 | Tieben et al. | 220/326 |
| 7,681,594 B2 | 3/2010 | Gossett et al. | |
| 8,251,373 B2 | 8/2012 | Lev et al. | |
| 2002/0195455 A1* | 12/2002 | Takahashi et al. | 220/806 |
| 2006/0081635 A1* | 4/2006 | Matsutori et al. | 220/378 |
| 2008/0315141 A1* | 12/2008 | Thrash et al. | 251/170 |

FOREIGN PATENT DOCUMENTS

GB      2214994      9/1989

OTHER PUBLICATIONS

"Twinlock Quick Opening Closure," Informational Pamphlet, on www.pipelineequipment.com; Oct. 16, 2013.

* cited by examiner

*Primary Examiner* — Mickey Yu
*Assistant Examiner* — Niki Eloshway
(74) *Attorney, Agent, or Firm* — Middleton Reutlinger (57) ABSTRACT

A closure comprises a hub with a central opening and a head pivotally connected to the hub, the head sealing the central opening when in a closed position. A lip seal relief is defined by a stepped surface between the head and the hub so that when the head is closed, the relief or clearance is provided between the head and hub inhibiting damage to a seal.

11 Claims, 7 Drawing Sheets

CLOSURE LIP SEAL RELIEF

CROSS-REFERENCE TO RELATED DOCUMENTS

None.

BACKGROUND OF THE INVENTION

1. Field of the Invention

Present embodiments relate generally to a closure for a pressure vessel or pipe. More specifically, but not by way of limitation, present embodiments relate to a relief structure for a lip seal utilized with a closure mechanism for a pressure vessel or pipe.

2. Description of the Related Art

Closures for pressure vessels and pipes typically utilize a round door or head adapted to fit in the aperture of a body or hub. The hub is connected to a vessel or pipe system or other structure which is typically pressurized. The door or head is lockingly engaged to the hub when in the closed position so that the system or vessel may be pressurized without unknowingly allowing for opening of the head from the hub.

A bore or aperture of the hub has an inner circumferential groove for supporting a portion of a locking member. The door has a locking ring proximate a circumferential portion of an outer surface of the door wherein the locking ring is engaged to cooperate with the groove about the aperture after the door is closed and seated in the aperture. The locking ring is typically biased by a band, ring or segment which is caused to expand or contract, causing the same expansion or contraction of the locking ring to lock or unlock the head from the hub. The locking ring may be formed of one or more segments or may be a unitary structure.

Some closure mechanisms for pressure vessels utilize a seal between the head and the hub in order to inhibit leakage of pressurized fluid from the inside of the closure to the outside. Additional to this point, some seals are designed to be oversized so as to provide and improve the seal between the head and the hub. In certain embodiments, the closure is oriented for use on a vertical pipe such that the head is in a horizontal plane and the weight of the head aids to retain the head against or within the hub. In these embodiments, where a seal is used, it is common for seals to incur damage due to the continuous weight of the head pressing the seal against the hub. In alternate embodiments where the head is in a vertical plane, the head may be so tightly locked in the hub so as to damage the seal. When the seal is oversized, it is possible that the seal may carry much of the load of the head. Over time, this causes damage to the seal and therefore, may result in leakage at the closure.

It would be desirable to overcome these and other deficiencies and provide structure which compensates for the problems associated with overloading of a lip seal.

SUMMARY OF THE INVENTION

According to some embodiments, a closure lip seal relief comprises a hub having a peripheral body and a central opening of circular shape, a head is moveable into and out of said hub to close or open the closure, respectively, the head has an outer peripheral edge and an inwardly facing surface and an outwardly facing surface, a seal groove is located along the inwardly facing surface of the head and adjacent to the outer peripheral edge, a seal is disposed within the seal groove and engages an inwardly facing surface of the hub, a step is located along one of the head and the hub, adjacent to the seal groove creating a clearance between the inwardly facing surface of the head and an engaging surface of the hub, the clearance allows the seal to expand toward the inner surface of the hub, the step carries the weight of the hub or alternatively receives force created between the head and the hub when the head is in a closed position within the hub. The closure lip seal relief wherein the step is disposed radially inwardly of the seal groove. The closure lip seal relief wherein the clearance is disposed radially outwardly of the seal groove. The closure lip seal relief wherein the step is disposed radially outwardly of the seal groove. The closure lip seal relief wherein the clearance is disposed radially inwardly of the seal groove. The closure lip seal relief wherein the seal groove is substantially square in section.

A closure lip seal relief, comprises a hub having a peripheral body and a central opening of circular shape, a head movable into and out of the hub to close or open the closure, respectively, the head having an outer peripheral edge and an inwardly facing surface and an outwardly facing surface, a seal groove located along the inwardly facing surface of the head and adjacent to the outer peripheral edge, a seal disposed within the seal groove and engaging an inwardly facing surface of the hub, the inwardly facing surface of the head having a seal groove disposed near the peripheral edge, a step disposed on the hub and extending toward the head one of radially inward or outward of the seal groove, the step creating a clearance near the other of radially inward or outward of the seal groove. The closure lip seal relief wherein the step has at least one tapered surface. The closure lip seal relief wherein the step has at least one engagement surface which is rounded. The closure lip seal relief wherein the step has an engagement surface which is flat.

A closure lip seal relief, comprises a hub having a peripheral body and a central opening of circular shape, a head movable into and out of the hub to close or open said closure, respectively, the head having an outer peripheral edge and an inwardly facing surface and an outwardly facing surface, a seal groove located along the inwardly facing surface of the head and adjacent the outer peripheral edge, a seal disposed within the seal groove and engaging an inwardly facing surface of the hub, the inwardly facing surface of the head having a seal groove disposed near the peripheral edge, a step disposed on the head and extending toward the hub one of radially inward or outward of the seal groove, the step creating a clearance near the other of radially inward or outward of the seal groove.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE FIGURES

Embodiments, which may be preferred and exemplary, together with further objects and advantages thereof, are more particularly described in the following detailed description taken in conjunction with the accompanying drawings, in which.

DETAILED DESCRIPTION

It is to be understood that the exemplary embodiments are not limited in their application to the details of construction and the arrangement of components set forth in the following description or illustrated in the drawings. The exemplary embodiments are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify various embodiments and that other alternative mechanical configurations are possible.

As referred to herein, the term axially means in the direction of the axis of the hub 12. Also, the term radially refers to the direction of a radius, for example from the axis of the hub toward the outer circumference thereof, or vice-versa.

Referring now to FIGS. 1-9, closures are provided which include a lip seal relief. The relief or clearance is formed by a step extending from one of the head or the hub toward the other of the head or the hub. The clearance allows a seal is disposed in a seal groove to expand toward the opposed head or hub. This inhibits the seal being damaged by the weight or force of the door closing against the seal.

Figure 1:
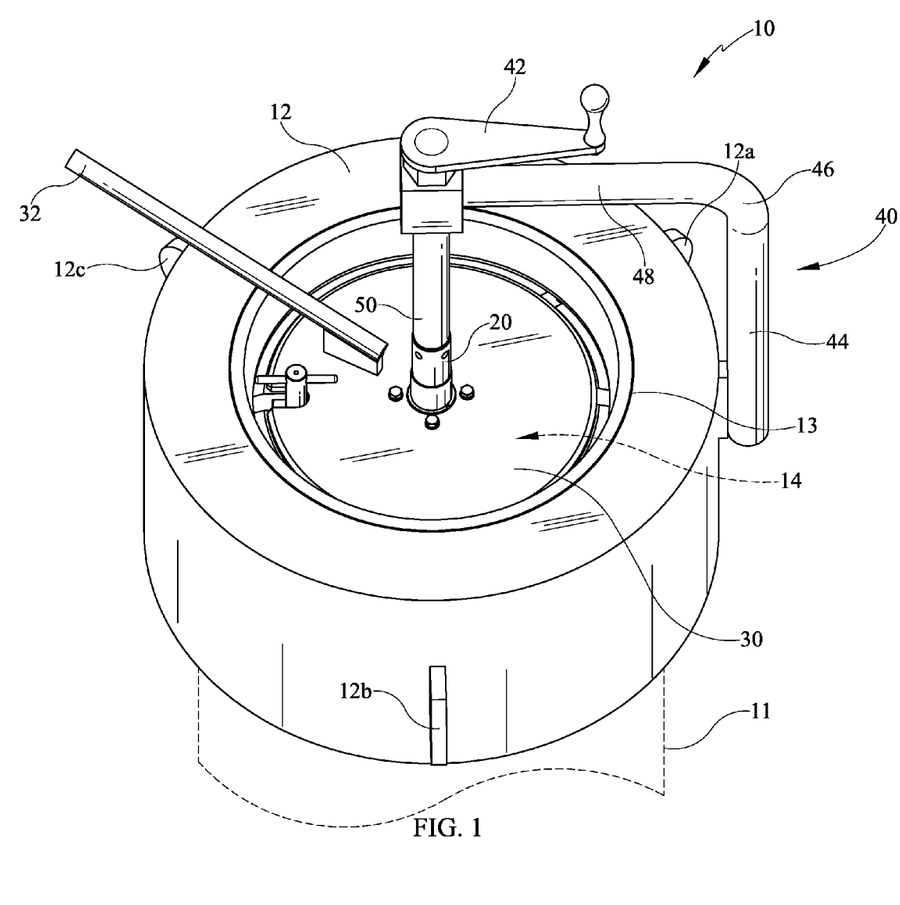
FIG. 1 is a perspective view of a first exemplary closure.

Referring initially to FIG. 1, a perspective view one embodiment of an alternative closure 10 is depicted. The closure 10 includes a hub 12 having a central bore or opening 13. The hub 12 of the exemplary embodiment is annular in shape however, the hub 12 may take various shapes other than the circular cross-section shape depicted. The head 14 is blocked from view in FIG. 1 by a cover plate 30. This cover plate 30 encloses an actuator mechanism, according to the exemplary embodiment but according to some embodiments may not be utilized depending on the structure used to open and close the closure 10. The hub 12 is weldable to the pressure vessel 11 or other system, such as a tank, pipeline, or enclosure subjected to pressure differential. The instant closure is mounted in a vertical configuration meaning the opening of the closure is facing upward or vertically or has a surface in a substantially horizontal plane. In this embodiment, the closure 10 does not utilize a hinge structure to open the head 14 from the hub 12, however a hinged design is also within the scope of the instant embodiments as will be shown and described further herein.

A post 20 extends from the cover 30 and provides a pivot axis for an actuator positioned therebelow. As noted before, rotation of the cover 30 causes movement of the actuator mechanism to move the locking segments into and out of engagement with the hub 12. A handle 32 is connected to the cover 30 to provide a means to pivot or rotate the cover 30 wherein such movement causes axial and rotational movement of an actuator below the cover 30.

A plurality of lugs are disposed about the outer perimeter of the hub 12. The lugs 12a, 12b and 12c allow lifting of the hub 12 or the closure assembly 10 for positioning on pipe or extension of a vessel. This configuration is typically utilized, although not limited to, a vertically configured pipe or extension wherein the surface of the cover 30 lies in a generally horizontal plane and the central opening 13 is also disposed in a horizontal plane.

The embodiment further comprises a davit 40. The davit 40 provides mechanical force through an input handle or crank assembly 42 to lift or lower the head 14. The davit includes a vertically extending post 44, a curved shoulder 46 and an arm 48 which extends horizontally over the head 14 of the closure 10. The curved shoulder 46 allows pivoting of arm 319 about the vertical axis of the post 44. An end of the arm 48 includes a crank assembly 42 which is rotatable to either lift or lower the head 314. An axial strut 50 is connected to the crank assembly 42 and may be connected by fastener or permanent connection, for example by welding, or integrally formed with, to the cover 30. Thus when the crank or handle assembly 42 rotates, the strut 50 raises or lowers the head. Similarly, the davit 40 may be utilized to lower the head 14 into the hub 12 as desired.

Figure 2:
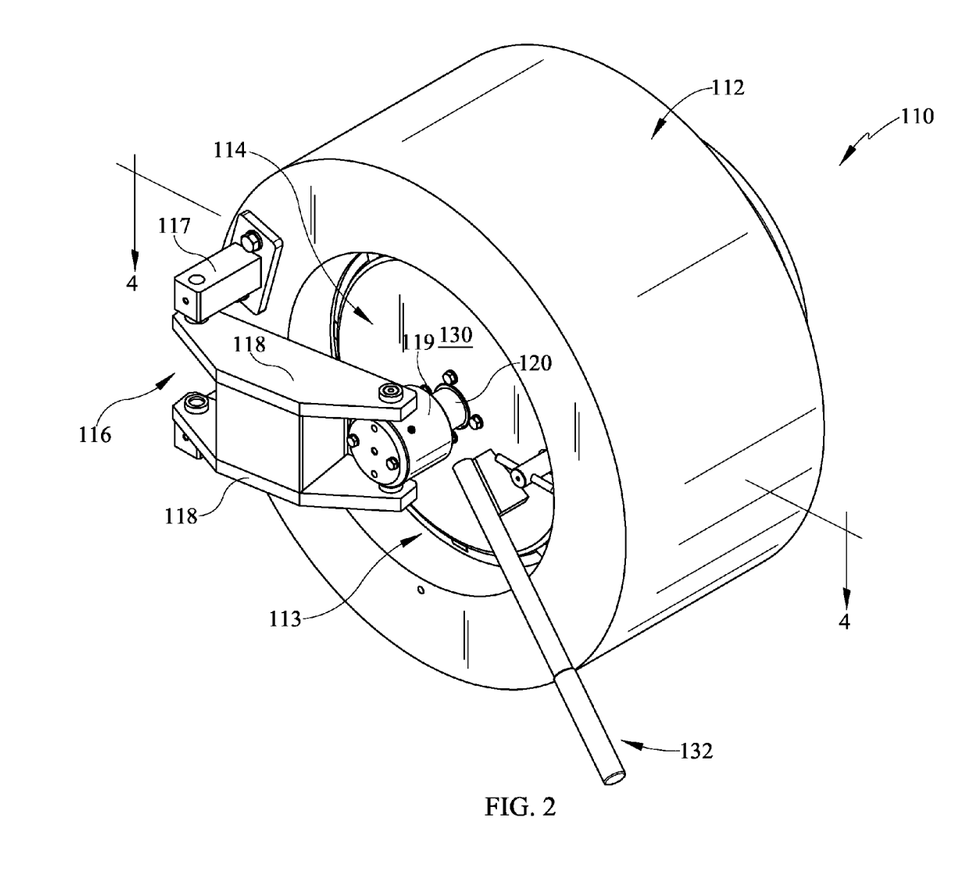
FIG. 2 is a perspective view of a second exemplary closure.

Referring now to FIG. 2, a perspective view of an alternate closure 110 is depicted. The closure 110 comprises a hub 112 and a head 114 which is pivotally connected to the hub 112 by hinge assembly 116. The closure 110 differs from the embodiment previously discussed in that the closure 110 is mounted, generally, on a horizontal pipe or vessel portion so that the axis of the hub 112 is horizontal and the head 114 is generally disposed in a vertical plane. Accordingly, this embodiment utilizes a hinge assembly 116 which allows the head 114 to be controllably removed from the hub 112 or re-inserted into the hub 112.

The closure 110 allows access to the pressure vessel or other system by way of the openable head 114. The head 114 is shown having a circular shape which fits within the bore 113 of the hub 112. When the head 114 is in the closed position as shown in FIG. 2, the pipe system or pressure vessel to which the closure 110 is connected may be pressurized. The hinge assembly 116 allows the head 14 to move from the closed position to an open position. In the open position, the head allows access to a pipe or pressure vessel or other pressurized system 11 (FIG. 1) to which the closure 110 is attached.

The hinge 116 may take various forms. According to an exemplary embodiment, the hinge assembly 116 includes at least one first hinge arm 117 and a second hinge arm 118 pivotally connected to the at least one first hinge arm 117. The second hinge arm 118 is connected to a third hinge arm 119 in pivotal fashion so that a double pivoting structure is provided in order to connect the head 114 to the hub 112. The at least one first hinge arm 117 is connected to the head 114 and may be integrally connected, such as by welding, or may be a bolted connection such as shown in the figure. The second hinge arm 118 has a first end and a second end. The first end is pivotally connected to the first pivot arm 117. The second end is pivotally connected to the third pivot arm 119. These pivotal connections between arms has a vertical pivot axis about which motion occurs.

Extending through the head 114 and through a cover plate 130 is a post 120 which connects to the third hinge arm 119.

First the post 120 defines a structure about which the cover plate 130 may pivot. The post 120 allows for structure to connect to the hinge assembly 16 so that the head 114 may be moved when an actuator is retracted. This allows interior access to the hub 112 and the pressure vessel or system.

Figure 9:
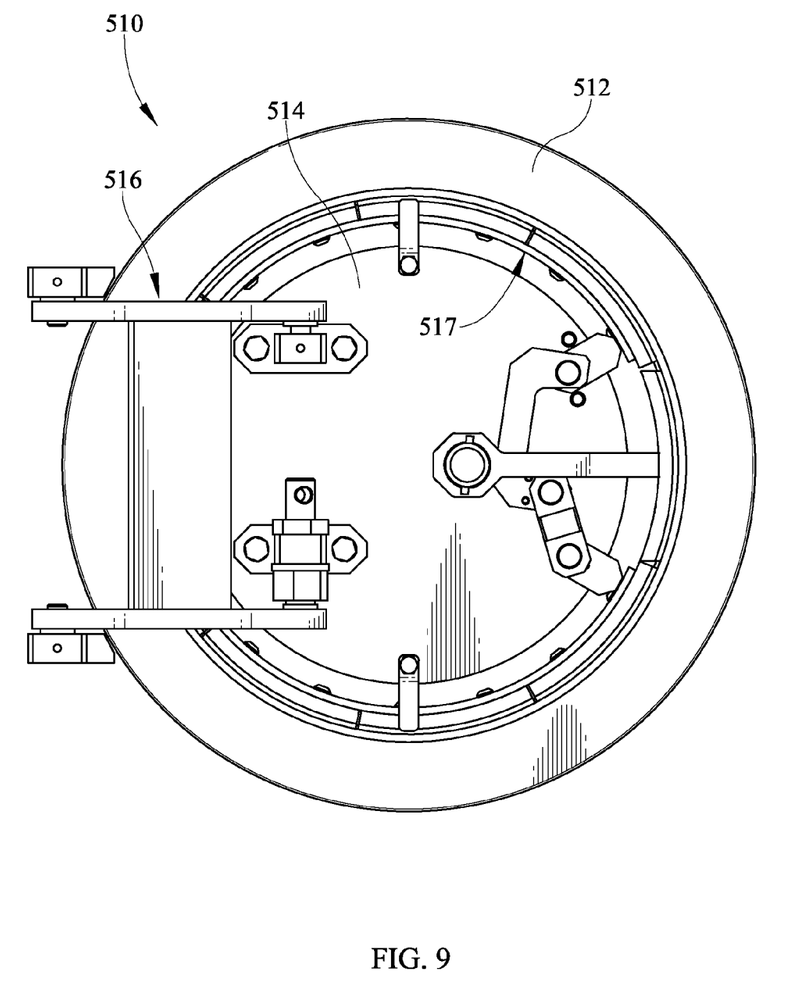
FIG. 9 is a front view of an alternate closure embodiment.

Referring now to FIG. 9 briefly, an alternate closure embodiment 510 is depicted. The closure 510 includes a hub 512 and a head 514 with a hinge 516 allowing opening and closing of the head 514 relative to the hub. The instant embodiment includes a locking assembly 517 which differs generally from the previous embodiments. The structure utilizes a plurality of locking segments joined by a band. The band may be actuated to move the locking segments into or out of engagement with the hub 512. It should be understood from the descriptions that various closures and locking assemblies may be utilized with the instant lip seal relief and that any of the embodiments provided are merely exemplary and should not be considered limiting.

Figure 3:
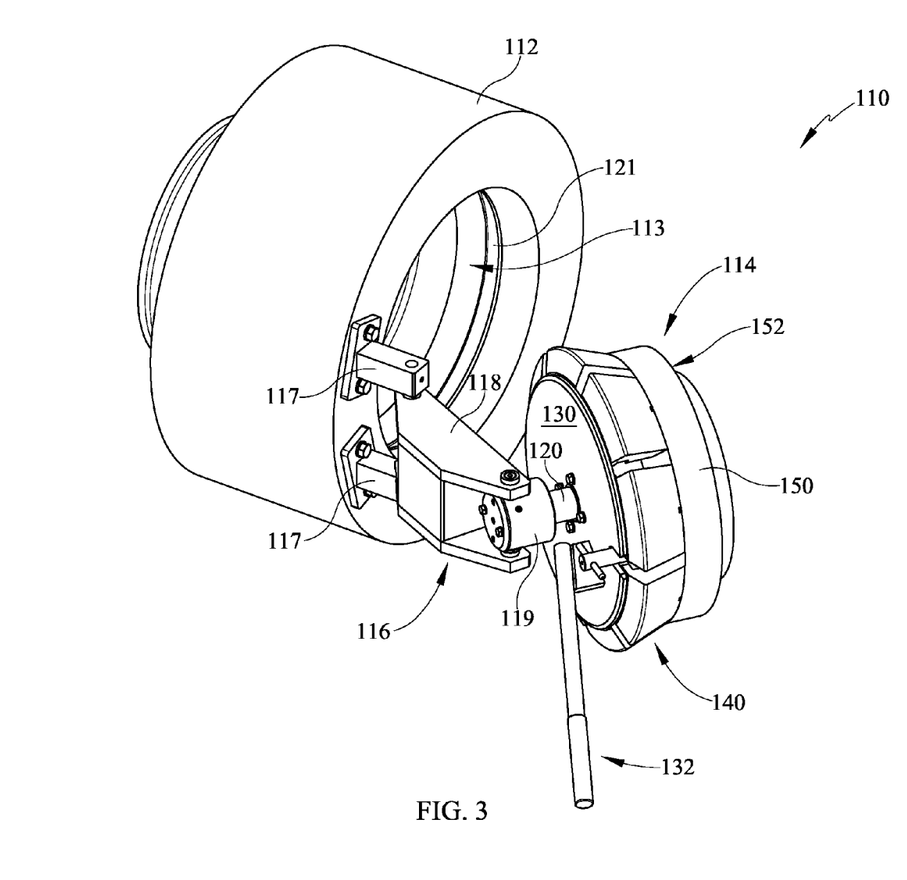
FIG. 3 is a perspective view of the closure of FIG. 2 in an open position.

Referring now to FIG. 3, a perspective view of the closure 110 is depicted with the closure 110 situated in an open position wherein the door or head 114 is opened away from the hub 112. This allows internal access to the hub 112 and pressure vessel or pressurized system 11 (FIG. 1) after the vessel or system is depressurized. The double pivoting function of the hinge is depicted wherein the second hinge arm 118 is pivoted relative to the at least one first hinge arm 17. Additionally, the third hinge arm 119 is pivoted relative to the second hinge arm 18. Hence the two pivoting functions of the hinge assembly 116. However, it should be understood that a single pivot hinge assembly may be utilized or other hinge assembly three or more pivots.

Additionally shown in FIG. 3 is the internal bore 113 of the hub 112 is shown with the head 114 removed therefrom. Also shown in the figure is the cover plate 130 mounted on the post 120, as well as a locking ring assembly 140 positioned adjacent to cover plate 130 and on the head 114. Within the wall defining the bore 113 is the circumferential groove 121. The groove 121 receives elements of a locking ring assembly 140. The cover plate 130 engages a portion of the locking ring assembly 140 and sandwiches the assembly between a surface of the head 114 and a rear surface of a cover plate 130. As the cover plate rotates or pivots, the locking ring assembly 140 is actuated to extend or retract, locking or unlocking the assembly.

Also shown in FIG. 3, with the closure 110 open, the components of the head 114 may be discussed. The head 114 includes a generally circular peripheral edge 150. The peripheral edge 150 extends between an outward facing side 151 (FIG. 4) of the head, upon which the locking segment assembly 140 is disposed in the exemplary embodiment, and an inwardly facing surface 152. The inwardly facing surface 152 functions as an engagement surface which engages a corresponding surface 154 of the hub 112.

Figure 4:
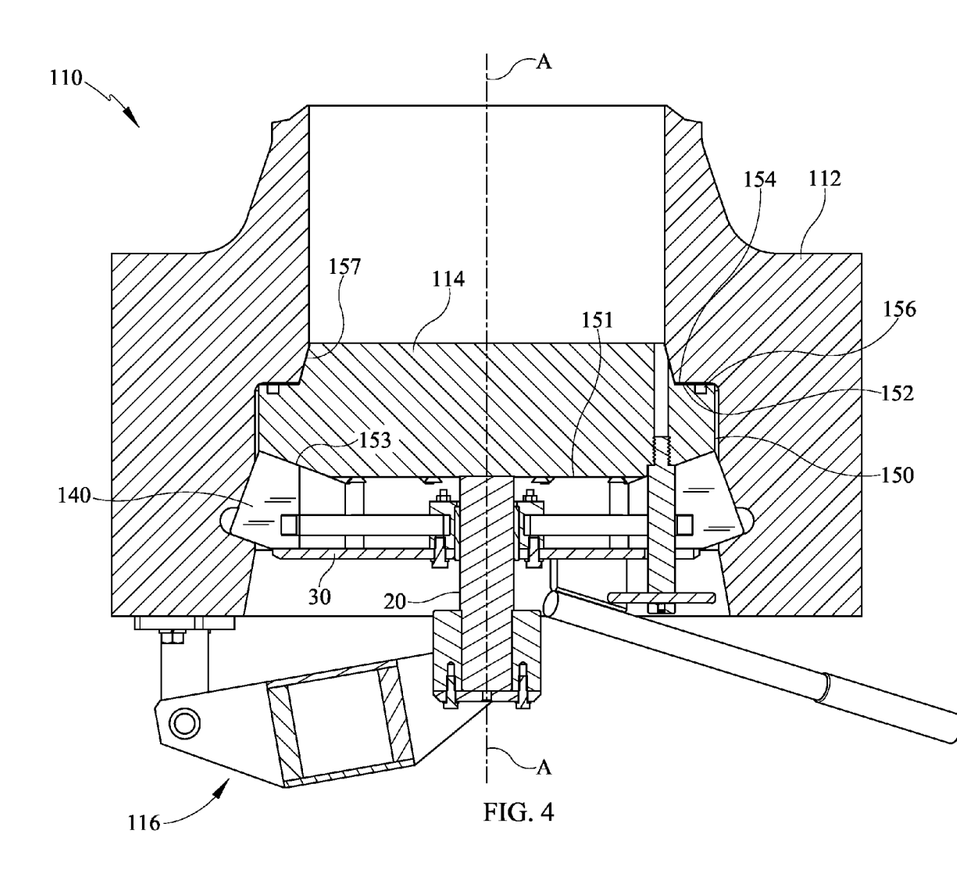
FIG. 4 is a section view of the exemplary closure of FIG. 2 in a closed position.

Referring now to FIG. 4, a section view of the closure 110 is depicted. In this view the engagement between the hub 112 and the head 114 may be seen along interior surfaces of the hub 112. The hub 112 is shown having a central bore 113 wherein the head 114 is positioned. Within the hub 112, the head 114 includes a flat front surface 151 and a tapered surface 153 extending outwardly from the flat surface 151 to the radial edge of the hub 150. Moving axially inward relative to the hub 112, the hub engagement surface 154 extends radially inward and tapered surface 157 extends to an innermost surface of the head 114.

The hub 112 has at least one head engagement surface 154 which varies the interior diameter of the hub 112. At the opening of the hub 112 where the head 114 is inserted, the hub is of at least a first diameter. Moving inwardly through the hub 112, upwardly in the figure, the surface 154 inwardly in a radial direction at the head engagement surface 154. The surface 154 is at an angle of about 90 degrees to the peripheral edge 150 of the head 114 and the adjacent surface of the hub 112. Although this angle is depicted as 90 degrees, this is not a limiting characteristic as various angles may be utilized depending on the angle of surface 154 to adjacent surfaces within the hub and also depending on the angle of the engagement surface 152 or alternatively the angle of the peripheral edge 150. In summary, the surface 154 need not be perpendicular to the axis A of the hub 112.

The head engagement surface 154 extends radially inwardly and engages the corresponding hub engagement surface 154. Along the axially inward facing 152 is a sealing groove 156. The sealing groove retains a seal 160 (FIGS. 5, 6) which inhibits leakage of pressurized fluid between the hub 112 and the head 114. The seal 160 and sealing groove 156 extend circumferentially about the head 114. The seal 160 is recessed in the groove 156 but engages surface 154 of the hub when the system is pressurized. In alternative embodiments, the groove 156 may be located in the hub and the seal 160 disposed therein.

Figure 5:
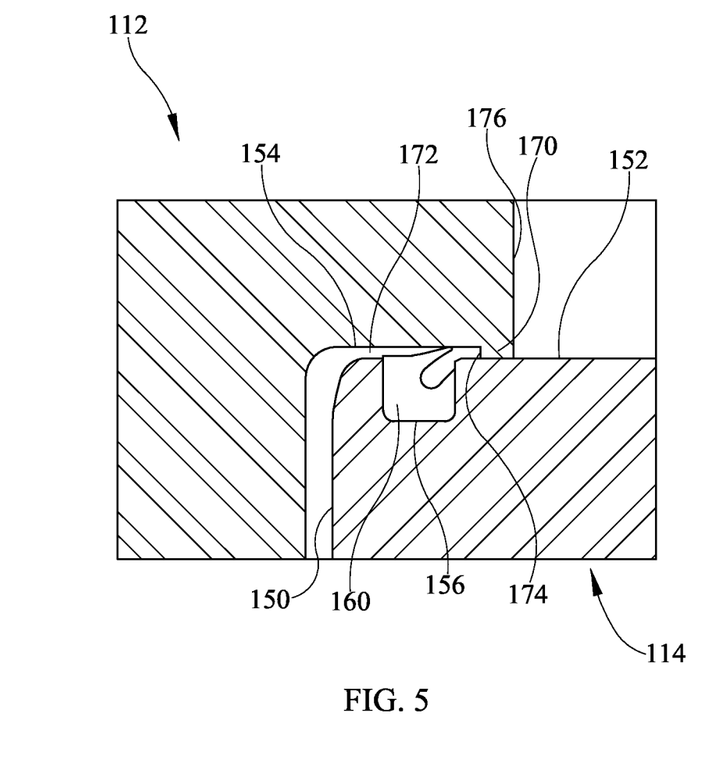
FIG. 5 is a cross sectional view of a first lip relief embodiment.

Referring now to FIG. 5, a detail section view of a first embodiment of a lip seal relief is depicted. In the detail section view, the head engagement surface 154 is depicted adjacent to the hub engagement surface 152 of the head 114. The seal groove 156 is also shown within the head 114 near a peripheral edge 150 thereof.

Located along the engagement surface 154 is a step 170 which extends in an axial direction closer to the head 152 than the remaining portion of the hub 154. As a result, the step 170 creates a clearance 172 between surface 152 and surface 154. In the instant embodiment, the step 170 is located radially inwardly of the seal groove 156. However, it is within the scope of the present embodiments that the step be located radially outward of the seal groove 156.

This step 170, according to the instant embodiment, has a surface which is perpendicular to the axis A-A (FIG. 4) of the hub. However, the step may alternatively include an engagement surface which is angled at an angle other than 90 degrees to the hub axis A-A. The step 170 is defined by a first leg 174 which extends from the head engagement surface 154 and an opposite leg 176 which defines a radially inner edge 176 of the hub 112. Additionally, it should be noted that the leg 174 is parallel to the axis A-A of the hub but may alternatively be disposed at an angle to the hub axis A-A (FIG. 4). The step 170 is shown with a flat surface engaging surface 152, however the step surface may be rounded or curved if desirable.

Figure 6:
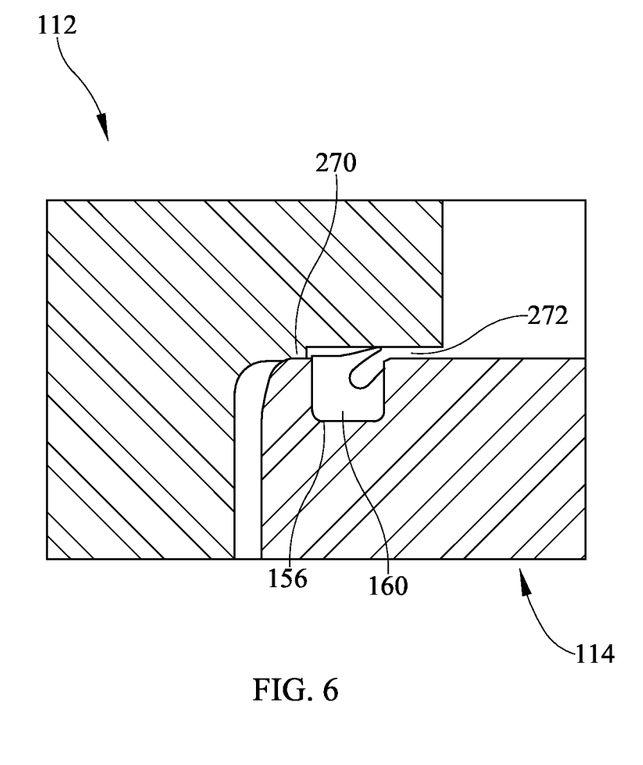
FIG. 6 is a cross sectional view of a second lip relief embodiment.

Referring now to FIG. 6, an alternate embodiment is shown wherein the hub step 270 is located radially outward of the seal groove 156. The step 270 is positioned radially outward so that the clearance 272 between the hub 112 and the head 114 is radially inward of the seal 160. The clearance in either of these embodiments allows the seal 160 to expand into the hub surface 154 so that the seal 160 is not crushed by the weight of the head 114 against the hub 112. In alternate embodiments, the seal 160 may expand from the hub to the head. Additionally, one skilled in the art will note the different cross sectional shape of the head 114 and the hub 112 from the previous embodiments. The closure lip seal structures depicted in the disclosure may be utilized in various embodiments of hubs and heads shown in FIGS. 1, 2, 3, 4 and 9 and therefore the specific shapes of heads and hubs shown in the exemplary embodiments should not be considered limiting.

Figure 7:
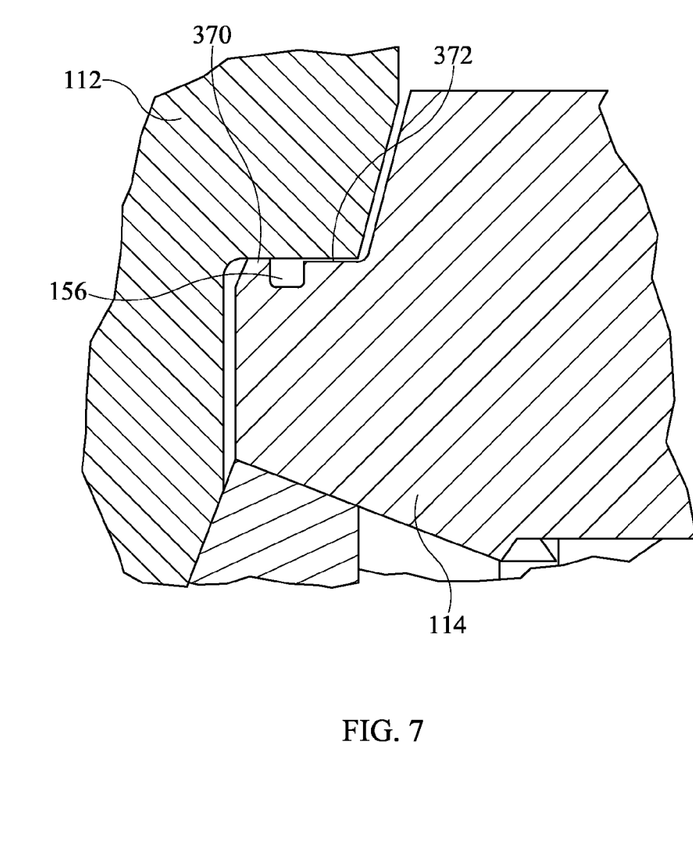
FIG. 7 is a cross sectional view of a third lip relief embodiment.

Referring now to FIG. 7, a third embodiment of a closure lip seal relief is depicted. In this embodiment, the step 370 is shown extending from the head 114 toward the hub 112. The step 370 is radially outward of the seal groove 156 and the seal may be seated within the groove 156. The step 370 is tapered along on side 176 toward said hub surface but may be tapered along both sides or may be non-tapered. In the depicted embodiment, the step 370 is shown radially outward of the seal groove 156. Accordingly, the clearance 372 is located radially inward of the seal groove 156.

Figure 8:
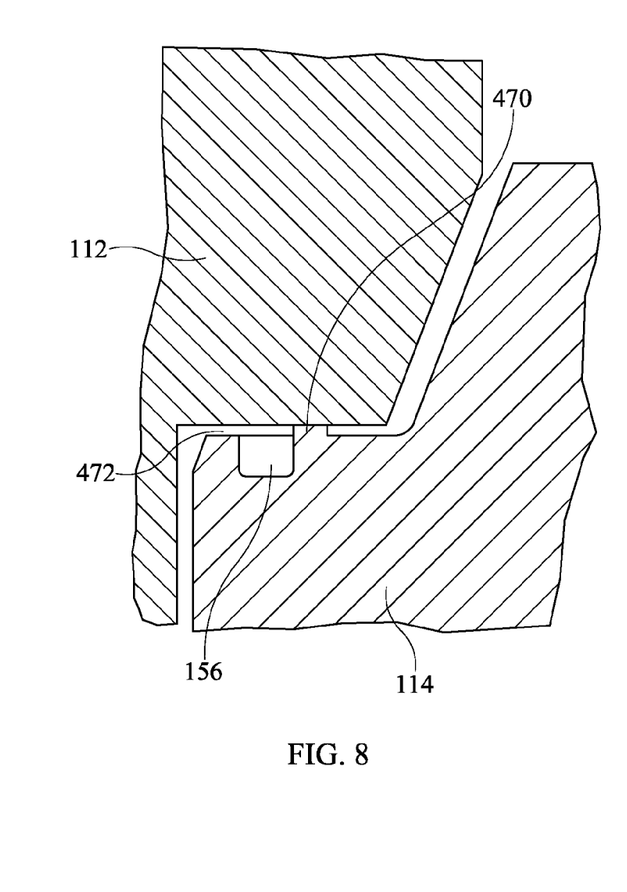
FIG. 8 is a cross sectional view of a fourth lip relief embodiment.

Referring now to FIG. 8, a further embodiment is of the closure lip seal relief is shown. In the instant embodiment, the step 470 is again disposed extending from the head 114 toward the hub 112. Additionally, the step 470 may extend on the radially inward side of the seal groove 156. According to this embodiment, the clearance 472 is radially outward of the seal groove 156.

According to any of the embodiments, the step may take various shapes and may be flat at the engagement surface with the opposite head or hub. The step may be continuous about the head or hub or alternatively may be formed of multiple circumferential segments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A closure lip seal relief, comprising:
    a hub having a peripheral body and a central opening of circular shape;
    a head movable into and out of said hub to close or open said closure, respectively;
    said head having an outer peripheral edge, an inwardly facing surface and an outwardly facing surface;
    a seal groove located along said inwardly facing surface of said head and adjacent said outer peripheral edge, said groove having a radially inner end and a radially outer end, each of said inner end and said outer end positioned opposite an opposed facing surface of said hub;

a seal disposed within said seal groove and engaging said opposed facing surface of said hub;

a step located along one of said head and said hub, said step being adjacent to said groove when said head is moved into said hub to close said closure;

wherein a clearance is created between said hub and said head, said seal at least partially located within said clearance so that said seal is not engaging said opposed facing surface prior to pressurization within said hub, and said seal engages said opposed facing surface after said pressurization of said hub.

2. The closure lip seal relief of claim 1 wherein said step is disposed radially inwardly of said seal groove.

3. The closure lip seal relief of claim 2 wherein said clearance is disposed radially outwardly of said seal groove.

4. The closure lip seal relief of claim 1 wherein said step is disposed radially outwardly of said seal groove.

5. The closure lip seal relief of claim 4 wherein said clearance is disposed radially inwardly of said seal groove.

6. The closure lip seal relief of claim 1, said seal groove being substantially square in section.

7. A closure lip seal relief, comprising:

a hub having a peripheral body and a central opening of circular shape;

a head movable into and out of said hub to close or open said closure, respectively;

said head having an outer peripheral edge, an inwardly facing surface and an outwardly facing surface;

a seal groove located along said inwardly facing surface of said head and adjacent said outer peripheral edge, said seal groove having a radially inner end disposed directly opposite an opposed facing surface of said hub;

a seal disposed within said seal groove;

a step disposed on said hub and extending toward said head an axial distance greater than a surrounding radial surface of said hub, said step being one of radially inward or outward of said seal groove when said head is moved into said hub to close said closure;

said step creating a clearance near the other of radially inward or outward of said seal groove, wherein said seal does not engage said opposed facing surface prior to pressurization of said hub and does engage said opposed facing surface after pressurization.

8. The closure lip seal relief of claim 7, said step having at least one tapered surface.

9. The closure lip seal relief of claim 7, said step having at least one engagement surface which is rounded.

10. The closure lip seal relief of claim 7, said step having an engagement surface which is flat.

11. A closure lip seal relief, comprising:

a hub having a peripheral body and a central opening of circular shape;

a head movable into and out of said hub to close or open said closure, respectively;

said head having an outer peripheral edge and an inwardly facing surface and an outwardly facing surface;

a seal groove located along said inwardly facing surface of said head and adjacent said outer peripheral edge, said seal groove having a radially inner end positioned opposite a hub surface;

a seal disposed within said seal groove and engaging said hub surface;

a step disposed on said head and extending toward said hub one of radially inward or outward of said seal groove;

said step creating a clearance near the other of radially inward or outward of said seal groove, said seal expanding toward said hub surface after pressurization to engage said hub and thereby inhibit compression damage of said seal.

\* \* \* \* \*